United States Patent
Busch et al.

(10) Patent No.: US 10,024,494 B2
(45) Date of Patent: Jul. 17, 2018

(54) LUBRICATION SYSTEM AND METHOD OF MAKING THE SAME

(71) Applicant: CanServ, LLC, Tulsa, OK (US)

(72) Inventors: Charles C. Busch, Mannford, OK (US); Dallas Copley, Sapulpa, OK (US); Jeff Bradshaw, Sand Springs, OK (US)

(73) Assignee: Canserv, LLC, Tulsa, OK (US)

( * ) Notice: Subject to any disclaimer, the term of this patent is extended or adjusted under 35 U.S.C. 154(b) by 132 days.

(21) Appl. No.: 15/178,219

(22) Filed: Jun. 9, 2016

(65) Prior Publication Data

US 2017/0051872 A1 Feb. 23, 2017

Related U.S. Application Data

(60) Provisional application No. 62/205,944, filed on Aug. 17, 2015.

(51) Int. Cl.
  *F16N 29/02* (2006.01)
  *F16N 13/00* (2006.01)
  *F16N 19/00* (2006.01)

(52) U.S. Cl.
  CPC ............ *F16N 29/02* (2013.01); *F16N 13/00* (2013.01); *F16N 19/00* (2013.01); *F16N 19/006* (2013.01); *F16N 2210/16* (2013.01); *F16N 2260/00* (2013.01); *F16N 2270/32* (2013.01); *F16N 2270/70* (2013.01)

(58) Field of Classification Search
  CPC .......... F16N 29/02; F16N 13/00; F16N 19/00; F16N 19/006; F16N 2210/16; F16N 2260/00; F16N 2270/32; F16N 2270/70
  See application file for complete search history.

(56) References Cited

U.S. PATENT DOCUMENTS

| | | | | |
|---|---|---|---|---|
| 4,406,169 A | * | 9/1983 | Ikeuchi | G01M 13/04 340/682 |
| 4,648,486 A | * | 3/1987 | Kayser | B65G 45/08 184/15.1 |
| 5,080,195 A | * | 1/1992 | Mizumoto | F16C 33/6622 184/104.1 |
| 5,180,034 A | * | 1/1993 | Lopes | F16N 7/40 184/6.1 |
| 5,381,874 A | * | 1/1995 | Hadank | F16N 29/02 184/6 |
| 5,390,762 A | * | 2/1995 | Nelson | F01M 11/0458 123/196 S |
| 5,878,842 A | * | 3/1999 | Rake | F16N 29/02 184/108 |
| 6,264,432 B1 | * | 7/2001 | Kilayko | F04B 17/04 417/44.1 |

(Continued)

*Primary Examiner* — Michael A Riegelman
(74) *Attorney, Agent, or Firm* — Hill Estill Law Firm

(57) ABSTRACT

A lubrication system for providing lubrication to equipment is disclosed herein. Generally, the lubrication system includes a lubrication supply container, a lubrication pump, a conduit for providing the lubricant to the oilfield pump, and a control system for setting the operating parameters of the lubrication system. The lubrication system can also include a sensing device for measuring various operational aspects of the equipment and adjusting the amount of lubrication responsive to data measured by the sensing device.

10 Claims, 2 Drawing Sheets

(56) References Cited

U.S. PATENT DOCUMENTS

| | | | | |
|---|---|---|---|---|
| 6,374,950 B1* | 4/2002 | Takeno | ............... | F16C 33/1085 |
| | | | | 184/7.4 |
| 7,571,597 B2* | 8/2009 | Delaloye | ................. | F01D 25/18 |
| | | | | 184/6.11 |
| 9,353,849 B2* | 5/2016 | Uusitalo | ............. | F16H 57/0435 |
| 9,813,000 B2* | 11/2017 | Jabusch | ................. | F04D 25/06 |
| 2001/0047647 A1* | 12/2001 | Cornet | .................... | F01D 15/08 |
| | | | | 60/772 |
| 2004/0197040 A1* | 10/2004 | Walker | .................... | F16C 19/52 |
| | | | | 384/462 |
| 2014/0238742 A1* | 8/2014 | Borek | .................... | F16N 29/02 |
| | | | | 175/40 |
| 2015/0068844 A1* | 3/2015 | Strandell | ................. | F16N 29/00 |
| | | | | 184/6.1 |
| 2016/0186740 A1* | 6/2016 | Klaphake | ................ | F04B 17/03 |
| | | | | 417/45 |
| 2016/0208983 A1* | 7/2016 | Moilanen | ................ | F16N 13/06 |
| 2017/0045040 A1* | 2/2017 | Czichowski | ............ | F03D 80/70 |
| 2017/0159713 A1* | 6/2017 | Ito | ....................... | F16C 33/6659 |

\* cited by examiner

LUBRICATION SYSTEM AND METHOD OF MAKING THE SAME

CROSS-REFERENCE TO RELATED APPLICATIONS

The present application is a conversion of U.S. Provisional Application having U.S. Ser. No. 62/205,944, filed Aug. 17, 2015, which claims the benefit under 35 U.S.C. 119(e). The disclosure of which is hereby expressly incorporated herein by reference.

STATEMENT REGARDING FEDERALLY SPONSORED RESEARCH OR DEVELOPMENT

Not Applicable.

BACKGROUND OF THE DISCLOSURE

1. Field of the Invention

This disclosure relates to a lubrication system that can be used in conjunction with equipment requiring lubrication. The lubrication system facilitates the delivery of a lubricant to lubrication points located on the equipment.

2. Description of the Related Art

Equipment requiring lubrication has to be lubricated a specific amount at specific locations or problems can occur. If the equipment is lubricated to little, the equipment can overheat and become inoperable. If the equipment gets too much lubrication, an environmental problem can arise due to excessive amounts of lubrication falling to the ground causing the need for expensive environmental remediation of the ground. Typically, the equipment has to be lubricated by hand. For example, an operator of the equipment would have to manually inject lubrication at the specific lubrication points of the equipment.

Accordingly, there is a need for an automated system to provide lubrication to the specific lubrication points of the equipment and in the correct amounts.

SUMMARY OF THE DISCLOSURE

The present disclosure is directed to a lubrication system for providing lubrication to equipment. Generally, the lubrication system includes a lubrication supply container for housing preselected lubrication for the equipment; a lubrication pump in fluid communication with the lubrication supply container for pumping the preselected lubrication to the at least one lubrication point of the equipment; a conduit in fluid communication with the lubrication pump and the at least one lubrication point of the equipment; and a control system for controlling the amount of preselected lubrication provided to the equipment by controlling duration, downtime and speed of the lubrication pump. The lubrication system can also include a sensing device for measuring various operational aspects of the equipment and adjusting the amount of lubrication responsive to data measured by the sensing device. The disclosure is also related to a method of using the lubrication system described herein to lubricate equipment.

DETAILED DESCRIPTION OF THE DISCLOSURE

The present disclosure relates to a lubrication system 10 for use with equipment 12 to provide a preselected lubricant to lubrication points 14 of the equipment 12. It should be understood and appreciated that the equipment 12 can be any type of equipment known in the art requiring grease injected therein to operate, or operate more efficiently. Furthermore, the lubrication points 14 can be any type of input for equipment 12 whereby lubrication may be provided thereto. The equipment 12 is depicted as a box in the figures. The equipment 12 has lubrication points 14 whereby lubricant can be injected into predetermined locations of the equipment 12.

Figure 1:
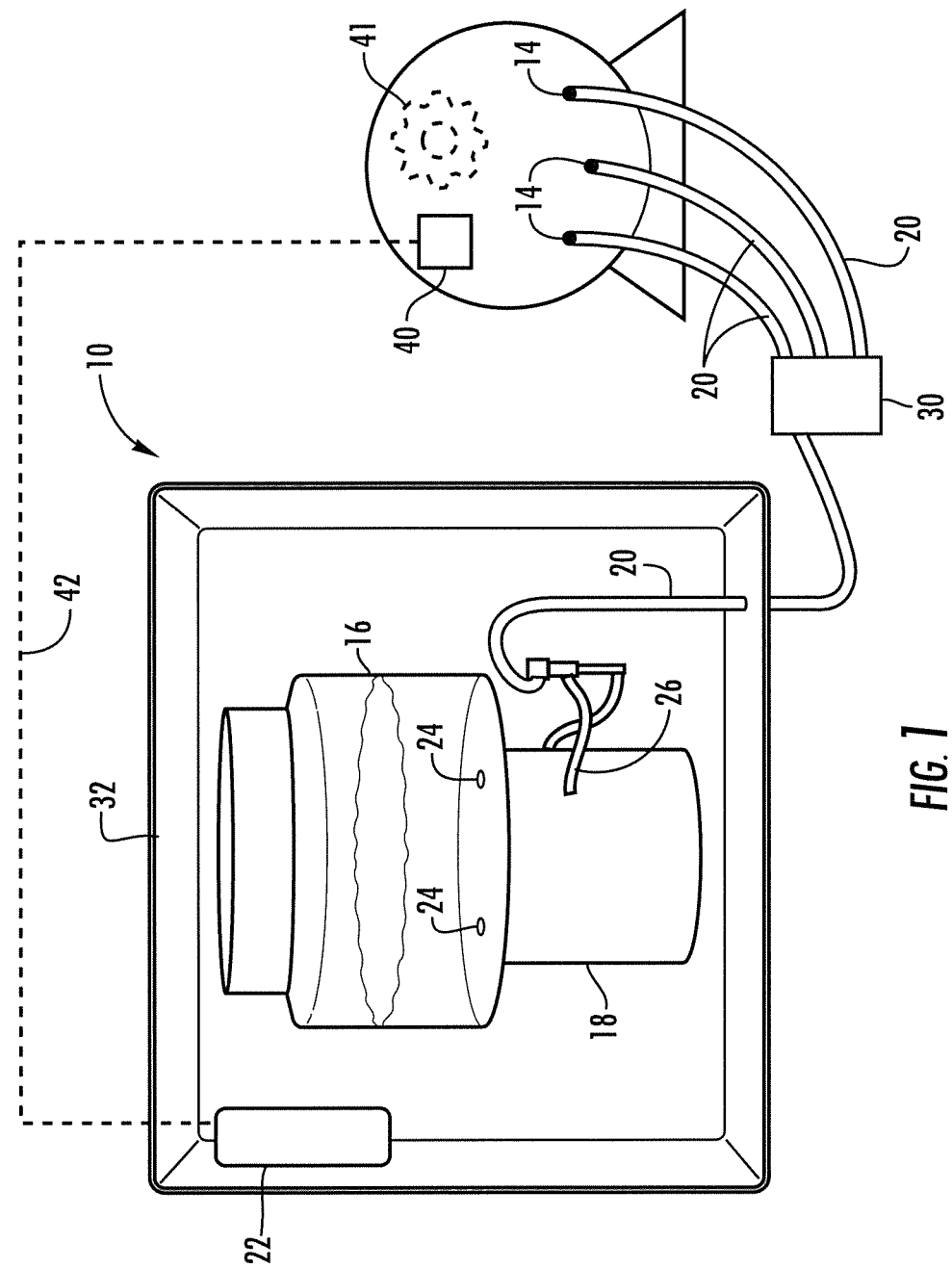
FIG. 1 is a perspective view of a lubrication system for equipment constructed in accordance with one embodiment of the present.

Referring now to FIG. 1, shown therein is the lubrication system 10 constructed in accordance with one embodiment of the present disclosure. In this embodiment, the lubrication system 10 includes a lubrication container 16 for housing the desired lubricant, a lubrication pump 18 to force the lubricant into the equipment 12 via the lubrication points 14, a conduit 20 for delivering the lubricant from the lubrication pump 18 to the lubrication points 14 of the oilfield pump, and a control system 22 to control the lubrication pump 18. In a further embodiment of the present disclosure, the lubrication system 10 includes a housing 17 for encapsulating the lubrication container 16, the lubrication pump 18, the control system 22 and a portion of the conduit 20.

The lubricant of the lubrication system 10 can be any type of lubricant known by one of ordinary skill in the art used with equipment 12. In one embodiment of the present disclosure, the lubricant is grease. Grease is easier to clean up and keep from soaking into the soil if spilled.

The lubrication container 16 can be any type of container that can hold lubrication and be refilled with lubrication. The lubrication container 16 can be designed such that it is connects directly to the lubrication pump 18 thereby creating fluid communication between the lubrication container 16 and the lubrication pump 18.

The lubrication pump 18 can be any type of pump known in the art. In one embodiment, the lubrication pump 18 can operate at variable speeds. At higher speeds, the lubrication pump 18 is able to increase the flow of lubricant (provide more lubricant per unit of time) to the equipment 12 via the lubrication points 14. The lubrication pump 18 can also be designed such that the lubrication container 16 can be connected to the lubrication pump 18. Generally, the lubrication pump 18 includes an inlet 24 for receiving the lubricant and an outlet 26 where the lubricant exits the lubrication pump 18. In one embodiment of the present disclosure, the inlet 24 of the lubrication pump 18 is where the lubrication container 16 and the lubrication pump 18 connect together. The outlet 26 is where the lubricant is expelled from the lubrication pump 18 and into the conduit 20. In a further embodiment of the present disclosure, the lubrication pump 18 is provided with a pressure relief device whereby the lubricant is permitted to return to the lubrication container 16. One example of the lubrication pump 18 is the Quicklub® pump by Lincoln Industrial Corporation.

The conduit 20 can be any type that can handle lubricants for the equipment 12 and such that one end of the conduit 20 is connectable to lubrication pump 18 and the other end is connectable to the lubrication points 14 of the oilfield pump 12.

The control system 22 can be any type of digital or analog computer, or computer processor, which can be programmed specifically for each type of equipment 12 that the lubrication system 10 will be used for. In one embodiment, the control system 22 can be a programmable logic controller. The control system 22 can be electronically connected to any element of the lubrication system 10 such that the control system 22 can effectively control the various elements. Examples of things that can be controlled by the control system 22 include the length of time the lubrication pump 18 runs, the length of time the lubrication pump 18 does not run, and the speed at which the lubrication pump 18 operates, which controls the amount of lubricant per unit of time that is delivered to the equipment 12.

Figure 2:
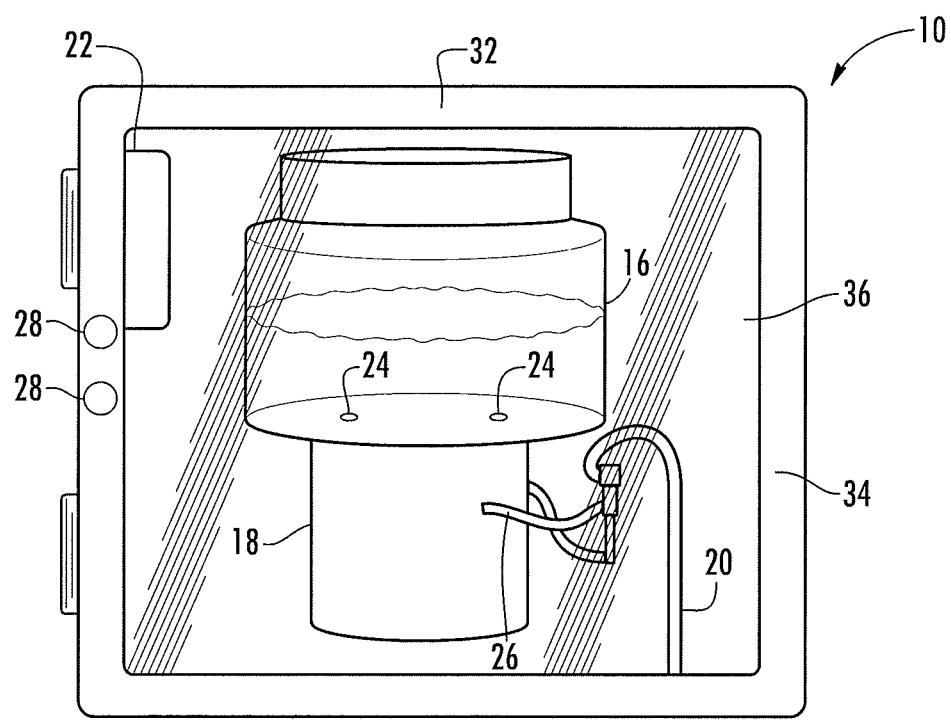
FIG. 2 is another perspective view of another embodiment of the lubrication system constructed in accordance with one embodiment of the present disclosure.

In a further embodiment of the present disclosure as shown in FIG. 2, the lubrication system 10 can include indicator lights 28 to relay certain bits of information to the operator of the equipment 12. Examples include an indicator light 28 to notify the user that the lubricant in the lubrication container 16 is low and an indicator light 28 to notify the user that the lubricant system 10 is operating. It should be understood that the control system 22 could be programmed to handle the functionality of the indicator lights 28.

In another embodiment of the present disclosure, the lubrication system 10 includes a divider valve 30 to split the lubricant coming out of the lubrication pump 18 into specific amounts when the equipment 12 has a plurality of lubrication points 14. The divider valve 30 can be any type know in the art. For example the divider valve 30 can be a MC-HP high pressure divider valve or any valve with a maximum operating pressure of 7500 psi. It should be understood and appreciated that the divider valve 30 can take the lubricant output from the lubrication pump 18 and divide it into any number of outlets required by the given equipment 12. In another embodiment of the present disclosure, the lubrication pump 18 can have multiple outputs wherein one or more of the outlets can be run through a divider valve 30.

The lubrication system 10 can be powered by any source such that the lubrication system 10 can operate and provide the lubricant to the equipment 12. For example, the lubrication system 10 can be powered with 3.5 amps@24 VDC (voltage direct current) or 2.0 amps@12 VDC.

Various elements of the lubrication system 10 can be contained in a lubrication system housing 32. The lubrication system housing 32 can be equipped with a door 34 with a portion of the door consisting of a transparent material 36 so as to allow the user of the lubrication system 10 to view the lubrication system 10 during operation.

In a further embodiment, the lubrication system 10 can include a sensing device 40 for measuring or detecting various aspects of the equipment 12 and providing this data to the control system 22. The lubrication output is increased or decreased from the lubrication system 10 depending upon the data measured from the equipment 12 by the sensing device 40. In one embodiment, the equipment 12 can be pumps used in oil and gas operations and the sensing device 40 can be a magnetic proximity sensor that detects rotation of a gear 41 in the pumps.

A signal conditioner can be used to receive the rotation data of any gears in the equipment 12 (pumps) and is connected to the control system 22. Gears in pumps have teeth that create impulses in the magnetic proximity sensor, which can be installed or positioned adjacent to the gear that the lubrication system 10 is being used to lubricate. The control system 22 will adjust the amount of lubrication dispensed from the lubrication system 10 responsive to the detected rotation of the gear in the pump. For example, the control system 22 will deploy a specific amount of grease once a certain number of impulses has been detected by the magnetic proximity sensor.

In one embodiment, the number of impulses (lube_impulses) detected to trigger a lubrication cycle from the lubrication system 10 can be calculated using the number of strokes desired before greasing (Strk), the number of teeth of the rotational gear (Tth) and the number of revolutions of the gear per stroke (Rev). It should be understood and appreciated that other variables could be used to calculate the number of impulses detected to trigger a lubrication cycle. The following equation can use the variables described herein to calculate the number of impulses detected to trigger a lubrication cycle:

$$\text{lube\_impulses} = \text{Tth} \times \text{Rev} \times \text{Strk}$$

In a further embodiment of the present disclosure, a failsafe timed operation can be implemented by the lubrication system in the event the magnetic proximity sensor fails to function properly. The failsafe timed operation will cause the lubrication system 10 to apply grease to the equipment 12 at a desired time interval. The RPM of the teeth of the gear is used to calculate the failsafe lubrication of the lubrication system 10. The teeth of the gear are located on the outer perimeter of the gear so they move at a slower speed than the motor shaft the gear is mounted on. Thus, the RPM of the teeth of the gear need to be calculated. In this embodiment, the RPM of the gear teeth (RPM_gear) are determined by using the diameter of the drive shaft (Diam_shft), the RPM of the pump motor (RPM_Mtr) and the diameter of the gear (Diam_gear). It should be understood and appreciated that other variables could be used to calculate the RPM of the teeth of the gear and any unites of measure can be used such that the equipment 12 is sufficiently lubricated. The RPM of the teeth of the gear can be calculated from the following equation:

$$\text{RPM\_gear} = (\text{Diam\_shft} \times \text{RPM\_Mtr}) / \text{Diam\_gear}$$

The failsafe timed operation (failsafe_time) can be calculated using the variables detailed herein. The equation used to calculate the failsafe timed operation is as follows:

$$\text{failsafe\_time} = 1.1 \times (\text{lube\_impulses}) / \text{Tth} \times \text{RPM\_gear}$$

The detected rotation data is sent to the control system 22 via a data link 42. It should be understood and appreciated that the data link 42 can be any type of device known in the art capable of relaying data from the sensing device 40 to the control system 22. The data link 42 can be wireless.

From the above description, it is clear that the present disclosure is well adapted to carry out the objectives and to attain the advantages mentioned herein as well as those inherent in the disclosure. While various embodiments have been described for purposes of this disclosure, it will be understood that numerous changes may be made which will readily suggest themselves to those skilled in the art and which are accomplished within the spirit of the disclosure and in the claims.

What is claimed is:

1. A lubrication system for equipment, the equipment having at least one lubrication point, the lubrication system comprising:
   a lubrication supply container for housing preselected lubrication for the equipment;

a lubrication pump in fluid communication with the lubrication supply container for pumping the preselected lubrication to the at least one lubrication point of the equipment;

a conduit in fluid communication with the lubrication pump and the at least one lubrication point of the equipment;

a control system for controlling the amount of preselected lubrication provided to the equipment by controlling duration, downtime and speed of the lubrication pump; and a magnetic proximity sensor for detecting rotation of a gear in the equipment.

2. The lubrication system of claim 1 wherein the lubrication system provides lubrication to the equipment responsive to gear rotation data in the equipment.

3. The lubrication system of claim 2 wherein the control system adjusts the amount of lubrication pumped from the lubrication system responsive to the gear rotation data in the equipment.

4. The lubrication system of claim 2 wherein the gear rotation data detected by the magnetic proximity sensor is relayed to the control system via a wireless data link.

5. The lubrication system of claim 1 wherein the equipment is a pump.

6. A method, the method comprising:

lubricating equipment with a lubrication system, the lubrication system comprising:

a lubrication supply container for housing preselected lubrication for the equipment;

a lubrication pump in fluid communication with the lubrication supply container for pumping the preselected lubrication to the at least one lubrication point of the equipment;

a conduit in fluid communication with the lubrication pump and the at least one lubrication point of the equipment;

a control system for controlling the amount of preselected lubrication provided to the equipment by controlling duration, downtime and speed of the lubrication pump; and a magnetic proximity sensor for detecting rotation of a gear in the equipment.

7. The method of claim 6 wherein the lubrication system provides lubrication to the equipment responsive to gear rotation data in the equipment.

8. The method of claim 7 wherein the control system adjusts the amount of lubrication pumped from the lubrication system responsive to the gear rotation data in the equipment.

9. The method of claim 7 wherein the gear rotation data detected by the magnetic proximity sensor is relayed to the control system via a wireless data link.

10. The method of claim 6 wherein the equipment is a pump.

\* \* \* \* \*